US012134283B2

(12) United States Patent
Herda

(10) Patent No.: US 12,134,283 B2
(45) Date of Patent: Nov. 5, 2024

(54) ART OR DECORATIVE PIECE

(71) Applicant: Joanne Marie Herda, Dallas, TX (US)

(72) Inventor: Joanne Marie Herda, Dallas, TX (US)

( * ) Notice: Subject to any disclaimer, the term of this patent is extended or adjusted under 35 U.S.C. 154(b) by 0 days.

(21) Appl. No.: 15/932,820

(22) Filed: May 1, 2018

(65) Prior Publication Data

US 2019/0001742 A1 Jan. 3, 2019

Related U.S. Application Data

(60) Provisional application No. 62/602,712, filed on May 4, 2017.

(51) Int. Cl.

*B44F 1/02* (2006.01)
*B44F 1/00* (2006.01)
*B44F 99/00* (2013.01)

(52) U.S. Cl.

CPC .................. *B44F 1/02* (2013.01); *B44F 1/00* (2013.01); *B44F 99/00* (2013.01); *Y10T 428/12* (2015.01); *Y10T 428/12993* (2015.01)

(58) Field of Classification Search

CPC ... B44F 1/02; Y10T 428/12993; Y10T 428/12
USPC ............ 428/687, 912.2, 913.3, 542.2, 542.6, 428/542.4
See application file for complete search history.

(56) References Cited

U.S. PATENT DOCUMENTS 2,607,142 A * 8/1952 Lee .......................... G09F 13/14 40/596
3,570,160 A * 3/1971 Spertus .................... A47G 1/06 40/765
4,824,729 A * 4/1989 Livi .......................... B44C 3/12 428/912.2
2010/0020425 A1* 1/2010 Wihte ..................... G09F 19/16 359/871
2012/0018692 A1* 1/2012 Langenwalter ......... E04H 17/20 256/65.02

OTHER PUBLICATIONS

[NPL-1] Aurora, "Titan Flat Top Post Cap"; May 3, 2015; <http://www.decksdirect.com/titan-post-cap.html>. (Year: 2015).*
[NPL-2] iGlow, "12 Pcs Outdoor Bright White LED Solar Ice Rock Crystal Glass Landscape Path Lights"; Mar. 18, 2016; <https://www.amazon.com/Outdoor-Bright-Crystal-Landscape-Decoration/dp/>. (Year: 2016).*

* cited by examiner

*Primary Examiner* — David Sample
*Assistant Examiner* — Donald M Flores, Jr.
(74) *Attorney, Agent, or Firm* — HAYNES AND BOONE, LLP

(57) ABSTRACT

An art or decorative piece according to which a reflective surface reflects artistic or decorative elements.

1 Claim, 8 Drawing Sheets

ART OR DECORATIVE PIECE

CROSS-REFERENCE TO RELATED APPLICATION

This application claims the benefit of the filing date of, and priority to, U.S. Application No. 62/602,712, filed May 4, 2017, the entire disclosure of which is hereby incorporated herein by reference.

BACKGROUND

The present disclosure relates in general to art or decorative pieces and, more particularly, to an art or decorative piece that includes one or more reflective surfaces.

DETAILED DESCRIPTION

Figure 1:
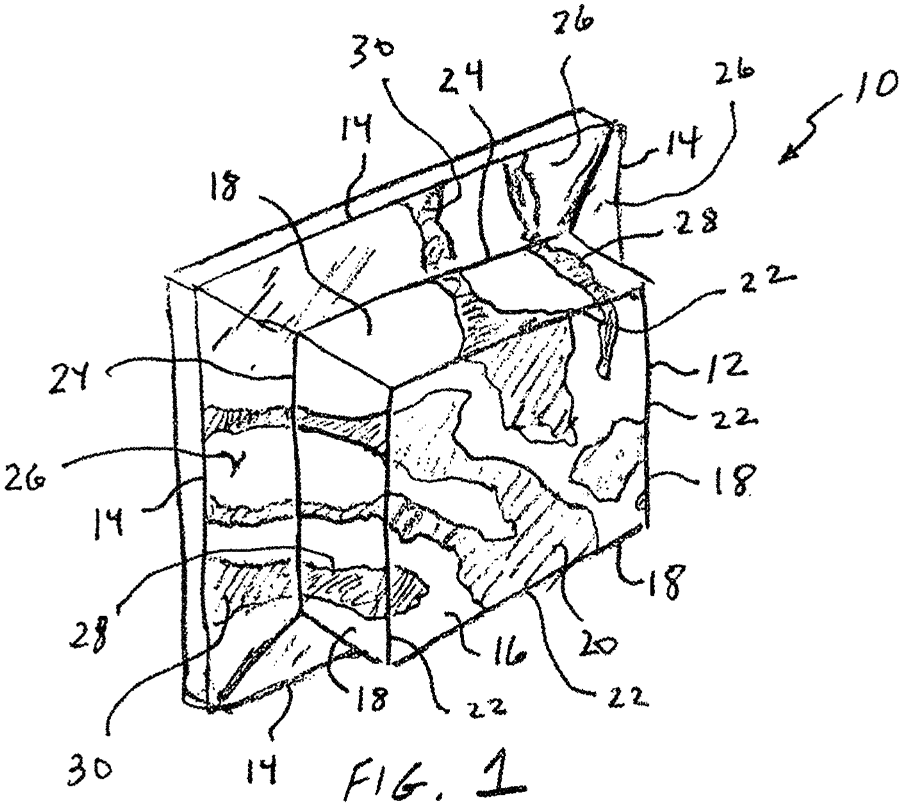
FIG. 1 is a perspective view of an embodiment of an art or decorative piece.
Figure 2:
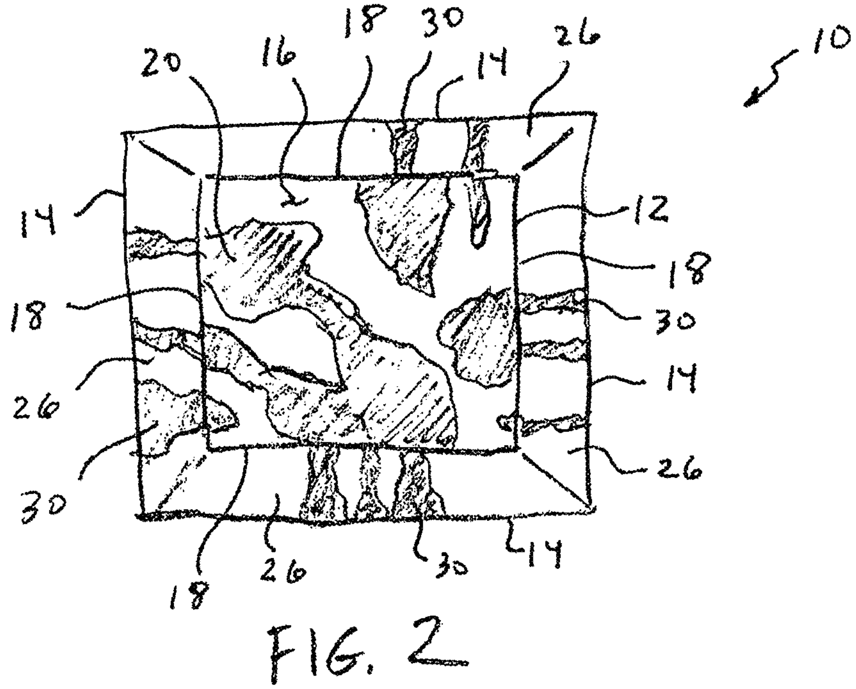
FIG. 2 is a front elevational view of the art or decorative piece of FIG. 1.
Figure 3:
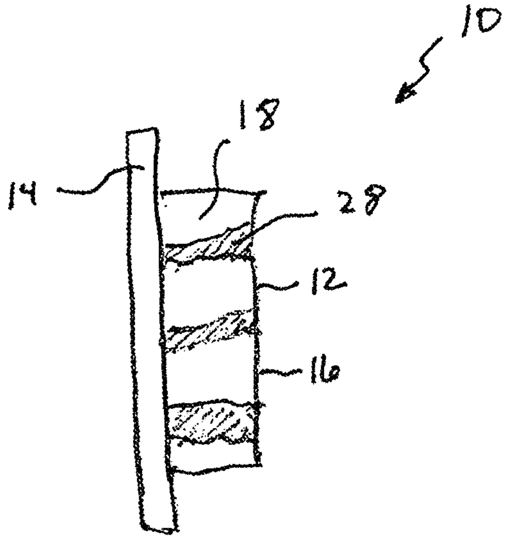
FIG. 3 is a left side elevational view of the art or decorative piece of FIG. 1.

Referring to FIGS. 1-4, an art or decorative piece is generally referred to by the reference numeral 10. The art or decorative piece 10 includes a block 12 and a plurality of frame members 14 positioned adjacent, or proximate, thereto. The block 12 defines a front surface 16 and four sides 18 extending from the front surface 16 and towards the plurality of frame members 14. One or more artistic or decorative elements 20 are visible on the front surface 16. Each side 18 includes edges 22 and 24. The frame members 14 define respective reflective surfaces 26. Each reflective surface 26 is spaced from the corresponding edge 22, and is adjacent, or proximate, the corresponding edge 24. As shown in FIGS. 1-3, in some embodiments, the block 12 is connected to the plurality of frame members 14.

One or more artistic or decorative elements 28 are visible on each of the sides 18. Each reflective surface 26 reflects the one or more artistic or decorative elements 28 visible on the corresponding side 18, creating a reflection 30 so that the reflection 30 of the one or more artistic or decorative elements 28 is visually associated with the one or more artistic or decorative elements 28. In some embodiments, this visual association may be the appearance that the one or more artistic or decorative elements 28 extend across the edge 24 and along the reflective surface 26 in a direction away from the block 12. In some embodiments, this visual association enhances the overall visual appearance or impression of the artistic or decorative piece 10. In some embodiments, this visual association may be the appearance that the reflection 30 is a part of the block 12 and/or the one or more artistic or decorative elements 20 and/or 28 on the block 12, giving the impression that the elements 20 and/or 28 are radiating outward from the block 12, providing a unique aesthetic and enhancing the overall look of the artistic or decorative piece 10.

In some embodiments, the block 12 is an artist canvas that is stretched across a wooden frame (not shown). As shown in FIGS. 1-4, the block 12 is a rectangular block or prism. In some embodiments, the block 12 is a circular or cylindrical block and thus has a single, circumferentially-extending side. In some embodiments, the block 12 is a box or container. In some embodiments, the block 12 is a five-sided box or a six-sided box. In some embodiments, the block 12 defines an internal region (not shown).

In some embodiments, the plurality of frame members 14 form a single, contiguous mirror frame. In some embodiments, the frame members 14 do not form a single, contiguous mirror frame, and instead are discrete frame members 14 that are separate from one another and, in some embodiments, may be connected to one another or, in other embodiments, may not be connected to one another. In some embodiments, the plurality of frame members 14 is part of a mirror or a reflective platter. In some embodiments, the plurality of frame members 14 is part of a picture frame with mirror framing. In some embodiments, the plurality of frame members 14 may be mounted on a wall or another vertically-extending surface. In some embodiments, the plurality of frame members 14 may rest on a table or another horizontally-extending surface. In some embodiments, the frame members 14 are part of a picture frame or mirror, which frame or mirror includes a support arm such as, for example, a kickstand-style support arm, which supports the frame members 14 on a table or another horizontally-extending surface.

In some embodiments, one or more of the reflective surfaces 26 extend angularly from a position adjacent, or proximate, the corresponding edges 24.

In some embodiments, the one or more artistic elements 20 and/or 28 are, include, or are part of, painted images, printed images, decorative beads or other 3-D components, carvings, or any combination thereof. In some embodiments, the one or more artistic elements 20 are different from the elements 28. In some embodiments, each of the one or more artistic or decorative elements 28 is different from the other elements 28. In some embodiments, each of the one or more artistic or decorative elements 28 is identical to the other elements 28.

In some embodiments, the one or more artistic or decorative elements 20 are painted images, and each of the one or more artistic or decorative elements 28 are also painted images formed by the "dripping" or flow of the paint along the sides 18.

Figure 4:
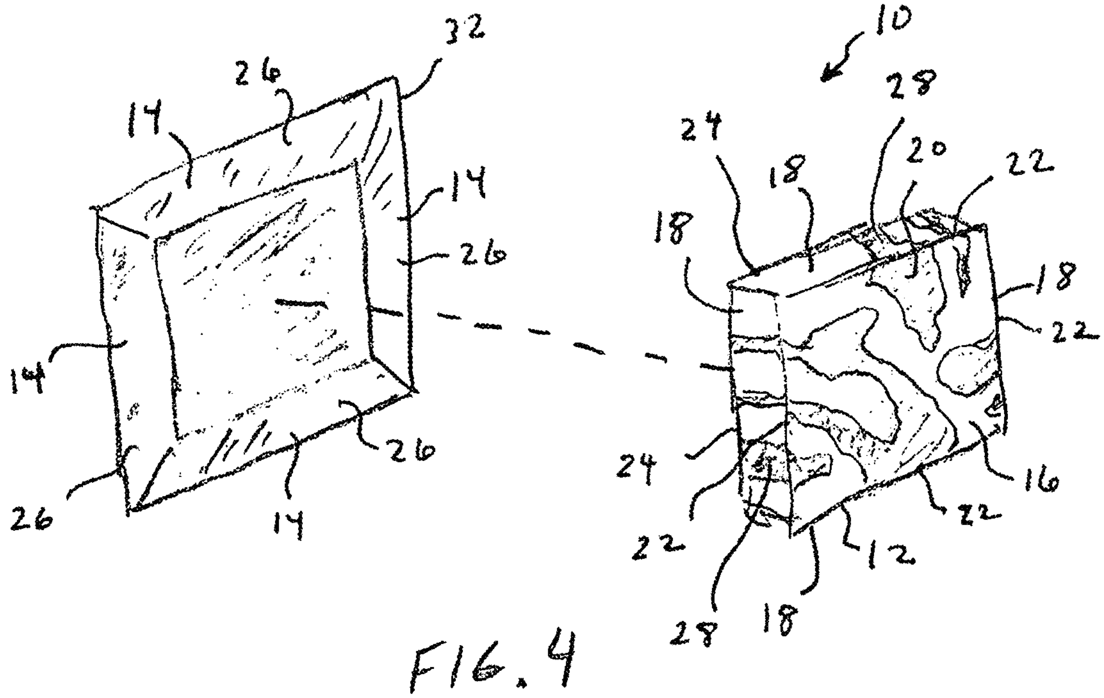
FIG. 4 is an exploded perspective view of the art or decorative piece of FIG. 1.

As shown in FIG. 4, in some embodiments, the plurality of frame members 14 is part of a mirrored picture frame 32, which may be wall mounted or supported in a portrait-like position with a support arm such as, for example, a kickstand-style support arm. The block 12 is connected to a portion of the picture frame 32. In some embodiments, the block 12 is connected to the picture frame 32 using adhesive, tape, staples, fasteners, or any combination thereof.

With continuing reference to FIG. 4, in some embodiments, the artistic or decorative piece 10 is produced by first applying the one or more artistic or decorative elements 20 to the front surface 16. Before, during, or after this application, the one or more artistic or decorative elements 28 are applied to the sides 18. Before, during, or after this application, the block 20 is connected to the picture frame 32.

Figure 5:
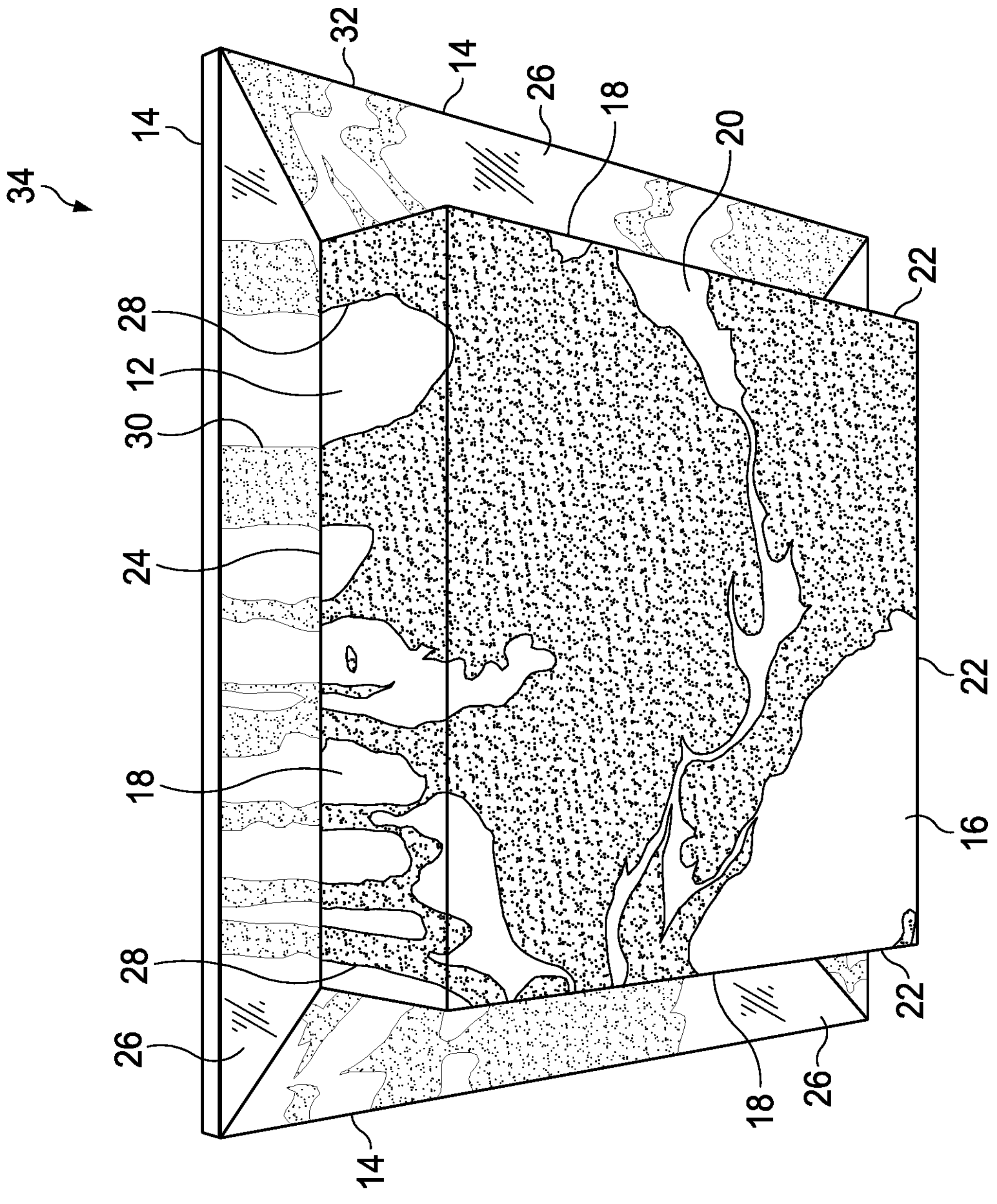
FIG. 5 is a perspective view of another embodiment of an art or decorative piece.
Figure 6:
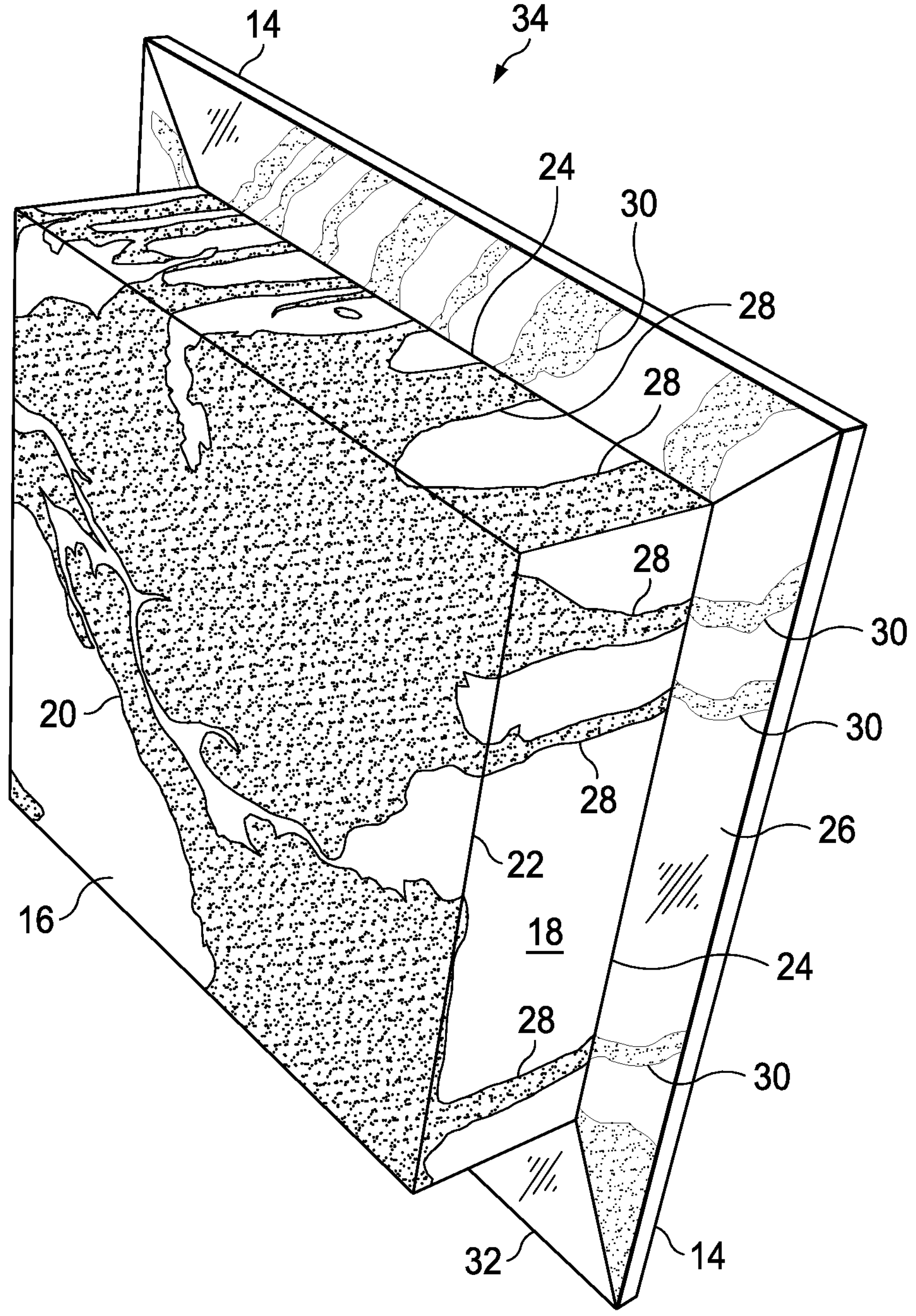
FIG. 6 is right side perspective view of the art or decorative piece of FIG. 6.

FIGS. 5 and 6 are perspective views of an artistic or decorative piece 34. The piece 34 includes several components that are identical or substantially similar components of the piece 10. These identical or substantially similar components are given the same references; however, the elements 20 and 28 of the piece 34 are different from the elements 20 and 28 of the piece 10.

Figure 7:
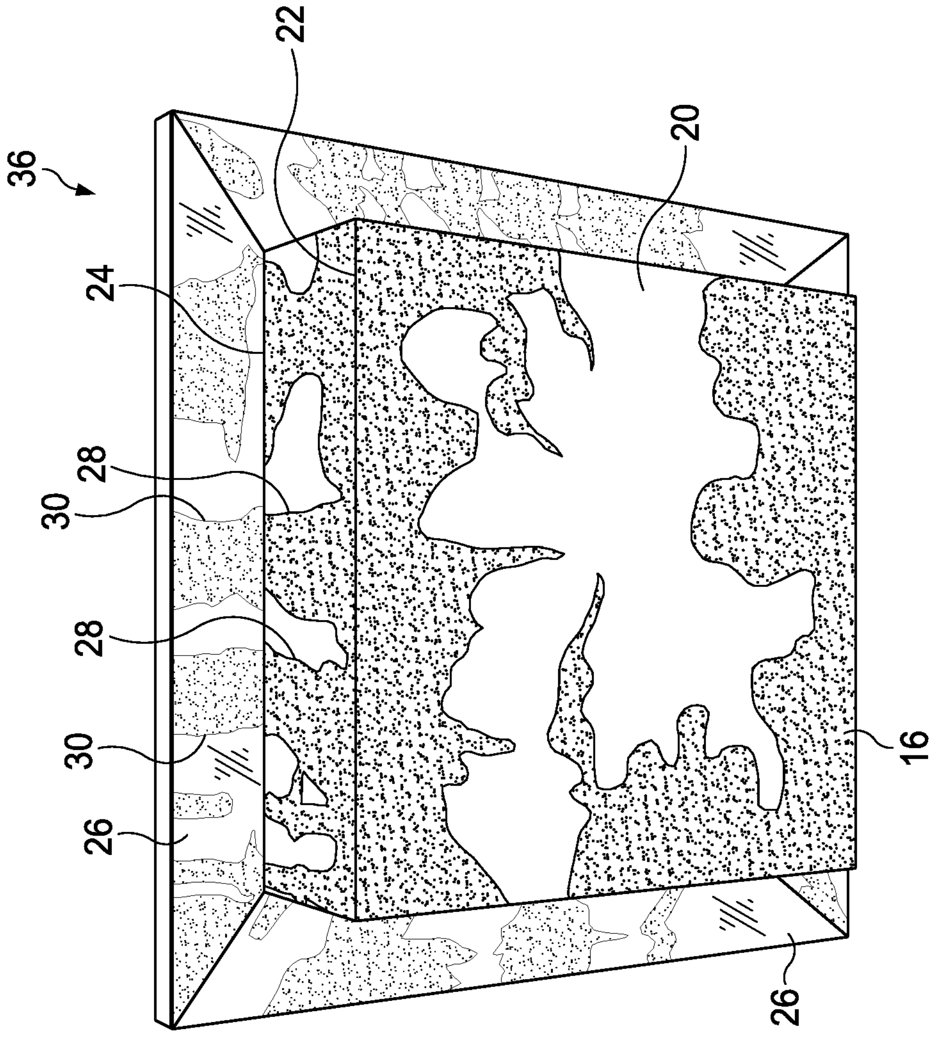
FIG. 7 is a perspective view of yet another embodiment of an art or decorative piece.

FIG. 7 is a perspective view of an artistic or decorative piece 36. The piece 36 includes several components that are identical or substantially similar components of the piece 10. These identical or substantially similar components are given the same references; however, the elements 20 and 28 of the piece 36 are different from the elements 20 and 28 of the piece 10.

Figure 8:
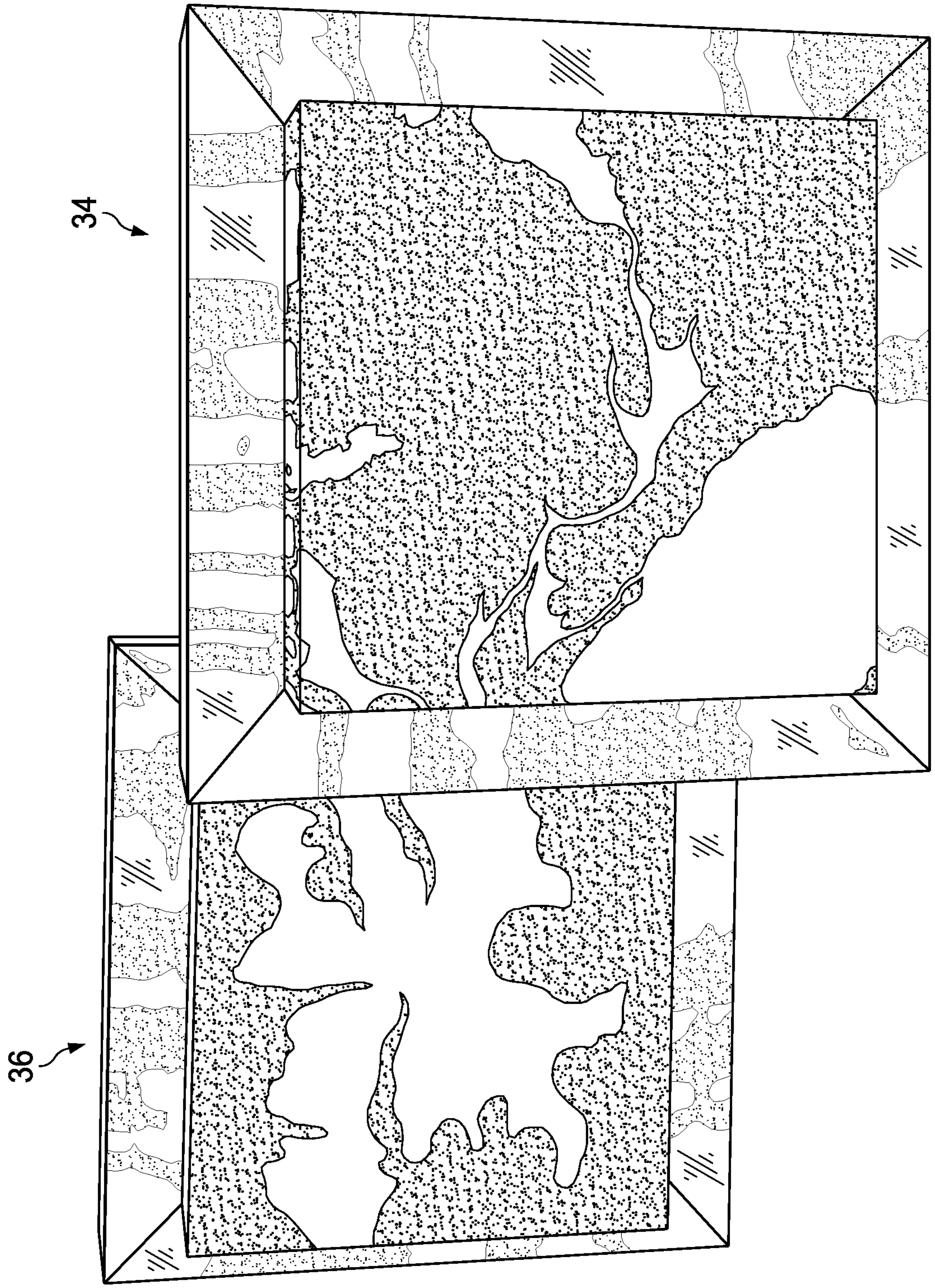
FIG. 8 is a perspective view of the art or decorative piece of FIGS. 5 and 6, as well as the art or decorative piece of FIG. 7.

FIG. 8 is a perspective view of the pieces 34 and 36.

Figure 9:
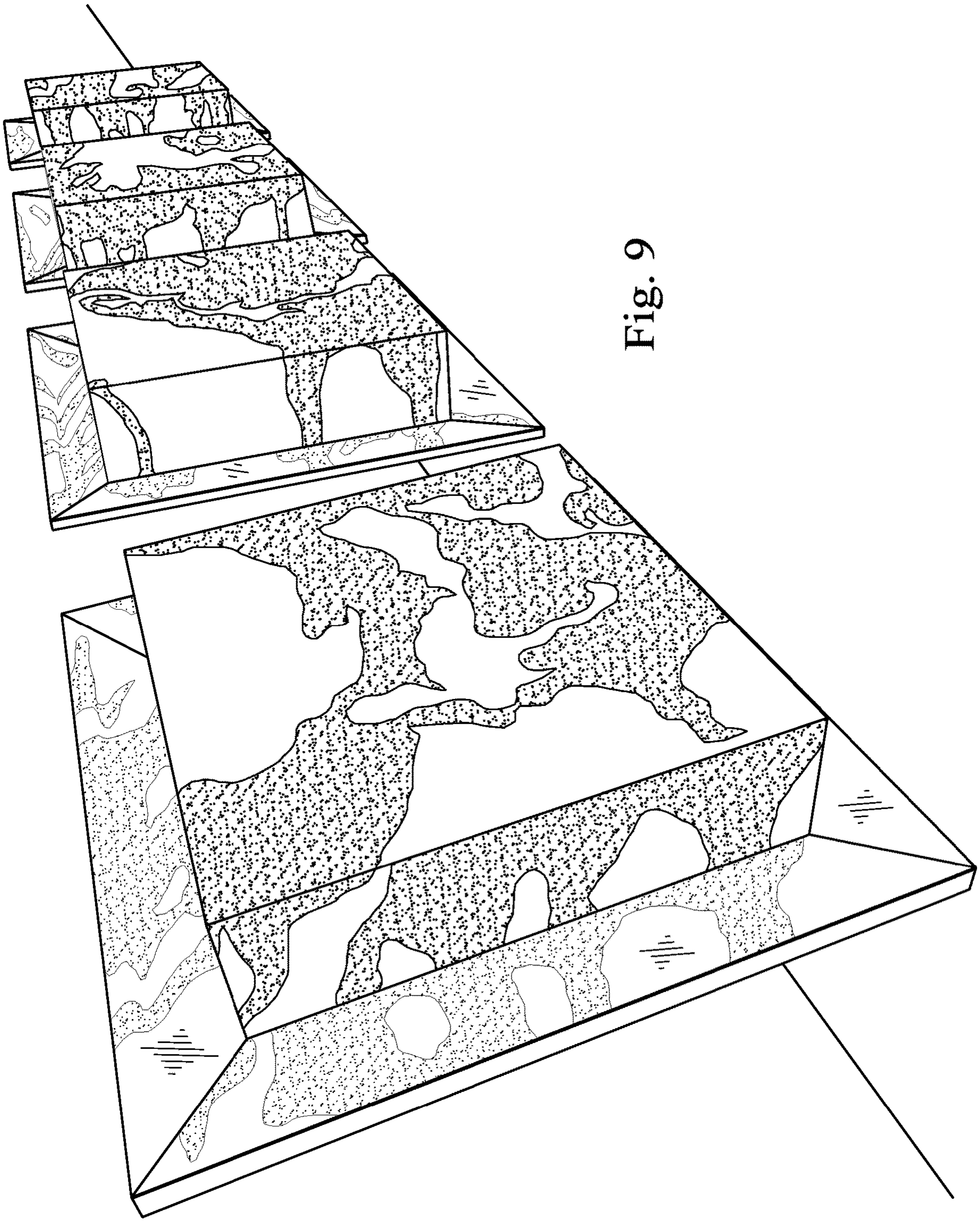
FIGS. 9 and 10 are perspective views of embodiments of art or decorative pieces.
Figure 10:
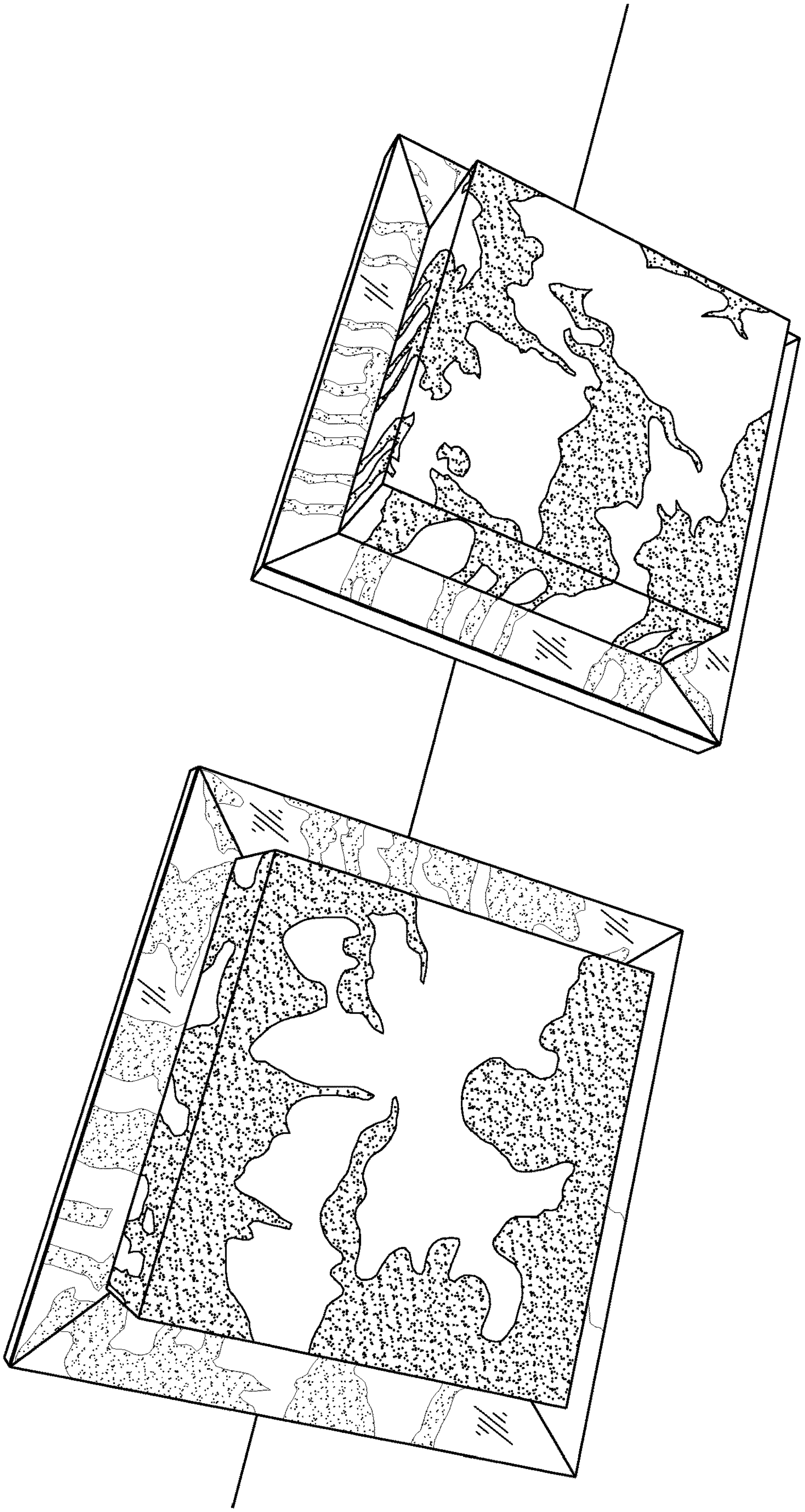

FIGS. 9 and 10 are perspective views of different embodiments of artistic or decorative pieces according to the present disclosure.

The present disclosure introduces an art or decorative piece that includes a block defining: a front surface; first and second sides extending from the front surface and spaced in a parallel relation, the first side including first and second edges, the extension of the first side from the front surface defining the first edge, the second side including third and fourth edges, the extension of the second side from the front surface defining the third edge; and third and fourth sides extending from the front surface and spaced in a parallel relation, each of the third and fourth sides being generally perpendicular to each of the first and second sides, the third side including fifth and sixth edges, the extension of the third side from the front surface defining the fifth edge, the fourth side including seventh and eighth edges, the extension of the fourth side from the front surface defining the seventh edge; wherein one or more first artistic or decorative elements are visible on the first side of the block; wherein one or more second artistic or decorative elements are visible on the second side of the block; wherein one or more third artistic or decorative elements are visible on the third side of the block; wherein one or more fourth artistic or decorative elements are visible on the fourth side of the block; wherein one or more fifth artistic or decorative elements are visible on the front surface of the block; a first frame member extending along the first side and defining a first reflective surface, the first reflective surface being spaced from the first edge; a second frame member extending along the second side and defining a second reflective surface, the second reflective surface being spaced from the third edge; a third frame member extending along the third side and defining a third reflective surface, the third reflective surface being spaced from the fifth edge; and a fourth frame member extending along the fourth side and defining a fourth reflective surface, the fourth reflective surface being spaced from the seventh edge; wherein the first reflective surface reflects the one or more first artistic or decorative elements on the first side so that a first reflection of the one or more first artistic or decorative elements, on the first reflective surface, is visually associated with the one or more first artistic or decorative elements on the first side; wherein the second reflective surface reflects the one or more second artistic or decorative elements on the second side so that a second reflection of the one or more second artistic or decorative elements, on the second reflective surface, is visually associated with the one or more second artistic or decorative elements on the second side; wherein the third reflective surface reflects the one or more third artistic or decorative elements on the third side so that a third reflection of the one or more third artistic or decorative elements, on the third reflective surface, is visually associated with the one or more third artistic or decorative elements on the third side; and wherein the fourth reflective surface reflects the one or more fourth artistic or decorative elements on the fourth side so that a fourth reflection of the one or more fourth artistic or decorative elements, on the forth reflective surface, is visually associated with the one or more fourth artistic or decorative elements on the fourth side. In an example embodiment, the first, second, third, and fourth reflective surfaces are positioned adjacent, or proximate, the second, fourth, sixth, and eighth edges, respectively. In an exemplary embodiment, the first, second, third, and fourth reflective surfaces are generally perpendicular to the first, second, third, and fourth sides, respectively. In an example embodiment, the first reflective surface extends angularly but is generally not perpendicular to the first side. In an example embodiment, the one or more first artistic or decorative elements are identical to the one or more second artistic or decorative elements, the one or more third artistic or decorative elements, the one or more fourth artistic or decorative elements, or any combination thereof. In an example embodiment, the one or more first artistic or decorative elements are different from the one or more second artistic or decorative elements, the one or more third artistic or decorative elements, the one or more fourth artistic or decorative elements, or any combination thereof. In an example embodiment, the first, second, third, and fourth frame members are connected to one another. In an example embodiment, the first, second, third, and fourth frame members form a single, contiguous frame. In an example embodiment, the one or more first artistic or decorative elements are, include, or are part of, painted images, printed images, decorative beads, carvings, or any combination thereof.

The present disclosure also introduces an art or decorative piece that includes a block defining a first side having a first edge, wherein one or more first artistic or decorative elements are visible on the first side; and a first frame member defining a first reflective surface, the first reflective surface being spaced from the first edge; wherein the first reflective surface reflects the one or more first artistic or decorative elements on the first side so that a first reflection of the one or more first artistic or decorative elements, on the first reflective surface, is visually associated with the one or more first artistic or decorative elements on the first side. In an example embodiment, the first reflective surface is positioned adjacent, or proximate, the second edge. In an example embodiment, the first reflective surface is generally perpendicular to the first side. In an example embodiment, the first reflective surface extends angularly but is generally not perpendicular to the first side. In an example embodiment, the one or more first artistic or decorative elements are, include, or are part of, painted images, printed images, decorative beads, carvings, or any combination thereof. In an example embodiment, the block defines: a front surface from which the first side extends; and a second side extending from the front surface, the second side having a second edge; wherein one or more second artistic or decorative elements are visible on the second side; wherein the art or decorative piece further includes a second frame member defining a second reflective surface, the second reflective surface being spaced from the second edge; wherein the second reflective surface reflects the one or more second artistic or decorative elements on the second side so that a second reflection of the one or more second artistic or decorative elements, on the second reflective surface, is visually associated with the one or more second artistic or decorative elements on the second side.

The present disclosure also introduces an art or decorative piece that includes a block defining a front surface, wherein one or more artistic or decorative elements are visible on another surface of the block, wherein the another surface is different from the front surface of the block; and a frame associated with the block, the frame defining a reflective surface; wherein the front surface and the another surface intersect to define a first edge of the another surface; wherein the reflective surface is spaced from the first edge of the another surface; and wherein the reflective surface reflects the one or more artistic or decorative elements on the another surface so that a reflection of the one or more artistic or decorative elements, on the reflective surface, is visually associated with the one or more artistic or decorative elements on the another surface. In an example embodiment, the another surface is generally perpendicular to the front surface; wherein the frame includes a first frame member that extends along the another surface. In an example embodiment, the another surface has a second edge; wherein the reflective surface is positioned adjacent, or proximate, the second edge. In an example embodiment, the reflection of the one or more artistic or decorative elements, on the reflective surface, provides an appearance that the reflection is part of the block and/or the one or more artistic or decorative elements. In an example embodiment, the appearance gives an impression that the one or more artistic or decorative elements radiate outward from the block.

It is understood that variations may be made in the foregoing without departing from the scope of the present disclosure.

In several illustrative embodiments, the elements and teachings of the various illustrative embodiments may be combined in whole or in part in some or all of the illustrative embodiments. In addition, one or more of the elements and teachings of the various illustrative embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several illustrative embodiments, while different steps, processes, and procedures are described as appearing as distinct acts, one or more of the steps, one or more of the processes, and/or one or more of the procedures may also be performed in different orders, simultaneously and/or sequentially. In several illustrative embodiments, the steps, processes, and/or procedures may be merged into one or more steps, processes and/or procedures.

In several illustrative embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several illustrative embodiments have been described in detail above, the embodiments described are illustrative only and are not limiting, and those skilled in the art will readily appreciate that many other modifications, changes and/or substitutions are possible in the illustrative embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. An art or decorative piece, comprising:

a block defining:

a front surface;

first and second sides extending from the front surface and spaced in a parallel relation, the first side including first and second edges, the extension of the first side from the front surface defining the first edge, the second side including third and fourth edges, the extension of the second side from the front surface defining the third edge, wherein the first side is perpendicular to the font surface, wherein the second side is perpendicular to the front surface, wherein the first and second edges are spaced in a parallel relation, wherein the third and fourth edges are spaced in a parallel relation, wherein the first and third edges are spaced in a parallel relation, wherein the second and fourth edges are spaced in a parallel relation, wherein the first and fourth edges are spaced in a parallel relation, and wherein the second and third edges are spaced in a parallel relation; and third and fourth sides extending from the front surface and spaced in a parallel relation, each of the third and fourth sides being generally perpendicular to each of the first and second sides, the third side including fifth and sixth edges, the extension of the third side from the front surface defining the fifth edge, the fourth side including seventh and eighth edges, the extension of the fourth side from the front surface defining the seventh edge, wherein the third side is perpendicular to the font surface, wherein the fourth side is perpendicular to the front surface, wherein the fifth and sixth edges are spaced in a parallel relation, wherein the seventh and eighth edges are spaced in a parallel relation, wherein the fifth and seventh edges are spaced in a parallel relation, wherein the sixth and eighth edges are spaced in a parallel relation, wherein the fifth and eighth edges are spaced in a parallel relation, and wherein the sixth and seventh edges are spaced in a parallel relation;

wherein one or more first artistic or decorative elements are visible on the first side of the block;

wherein one or more second artistic or decorative elements are visible on the second side of the block;

wherein one or more third artistic or decorative elements are visible on the third side of the block;

wherein one or more fourth artistic or decorative elements are visible on the fourth side of the block; and wherein one or more fifth artistic or decorative elements are visible on the front surface of the block; and a picture frame to which the block is connected, the picture frame comprising:

a first frame member extending along the first side and defining a first outside edge and a first reflective surface, the first reflective surface being spaced from the first edge and being different from a first side surface defined by the first side of the block, wherein the first reflective surface is planar;

a second frame member extending along the second side and defining a second outside edge and a second reflective surface, the second reflective surface being spaced from the third edge and being different from a second side surface defined by the second side of the block, wherein the second reflective surface is planar;

a third frame member extending along the third side and defining a third outside edge and a third reflective surface, the third reflective surface being spaced from the fifth edge and being different from a third side surface defined by the third side of the block, wherein the third reflective surface is planar; and a fourth frame member extending along the fourth side and defining a fourth outside edge and a fourth reflective surface, the fourth reflective surface being spaced from the seventh edge and being different from a fourth side surface defined by the fourth side of the block, wherein the fourth reflective surface is planar;

wherein the first reflective surface reflects the one or more first artistic or decorative elements on the first side;

wherein the second reflective surface reflects the one or more second artistic or decorative elements on the second side;

wherein the third reflective surface reflects the one or more third artistic or decorative elements on the third side;

wherein the fourth reflective surface reflects the one or more fourth artistic or decorative elements on the fourth side;

wherein the first, second, third, and fourth reflective surfaces are positioned adjacent or proximate the second, fourth, sixth, and eighth edges, respectively;

wherein the one or more first artistic or decorative elements are, include, or are part of painted images that are painted on the first side of the block, printed images that are printed on the first side of the block, or any combination thereof;

wherein the one or more second artistic or decorative elements are, include, or are part of painted images that are painted on the second side of the block, printed images that are printed on the second side of the block, or any combination thereof;

wherein the one or more third artistic or decorative elements are, include, or are part of painted images that are painted on the third side of the block, printed images that are printed on the third side of the block, or any combination thereof;

wherein the one or more fourth artistic or decorative elements are, include, or are part of painted images that are painted on the fourth side of the block, printed images that are printed on the fourth side of the block, or any combination thereof;

wherein the one or more fifth artistic or decorative elements are, include, or are part of painted images, printed images, decorative beads, carvings, or any combination thereof;

wherein the first, second, third, and fourth frame members form a single, contiguous frame;

wherein the first and third frame members define a first corner of the single, contiguous frame;

wherein the second and third frame members define a second corner of the single, contiguous frame;

wherein the second and fourth frame members define a third corner of the single, contiguous frame;

wherein the fourth and first frame members define a fourth corner of the single, contiguous frame;

wherein the first and second frame members define first and second portions, respectively, which are spaced in a parallel relation;

wherein the third and fourth frame members define third and fourth portions, which are spaced in a parallel relation;

wherein the first and third portions of the first and third frame members, respectively, are perpendicular to each other;

wherein the second and fourth portions of the second and fourth frame members, respectively, are perpendicular to each other;

wherein the first portion of the first frame member is adjacent the first reflective surface of the first frame member;

wherein the second portion of the second frame member is adjacent the second reflective surface of the second frame member;

wherein the third portion of the third frame member is adjacent the third reflective surface of the third frame member;

wherein the fourth portion of the fourth frame member is adjacent the fourth reflective surface of the fourth frame member;

wherein the first reflective surface extends angularly, but is not perpendicular to, the first side;

wherein the first portion of the first frame member is a first outside edge of the first frame member, the first outside edge of the first frame member extending from the fourth corner to the first corner, the first outside edge being spaced in a parallel relation from each of the first and second edges of the first side of the block;

wherein the second portion of the second frame member is a second outside edge of the second frame member, the second outside edge of the second frame member extending from the third corner to the second corner, the second outside edge being spaced in a parallel relation from each of the third and fourth edges of the second side of the block;

wherein the third portion of the third frame member is a third outside edge of the third frame member, the third outside edge of the third frame member extending from the first corner to the second corner, the third outside edge being spaced in a parallel relation from each of the fifth and sixth edges of the third side of the block;

wherein the fourth portion of the fourth frame member is a fourth outside edge of the fourth frame member, the fourth outside edge of the fourth frame member extending from the third corner to the fourth corner, the fourth outside edge being spaced in a parallel relation from each of the seventh and eighth edges of the fourth side of the block;

wherein the first outside edge of the first frame member is adjacent the first reflective surface of the first frame member, extends from the fourth corner to the first corner, is spaced in a parallel relation from each of the first and second edges of the first side of the block, and is:

spaced in a parallel relation from the second outside edge of the second frame member, which second outside edge is adjacent the second reflective surface of the second frame member, is spaced in a parallel relation from each of the third and fourth edges of the second side of the block, and extends from the third corner to the second corner;

perpendicular to the third outside edge of the third frame member, which third outside edge is adjacent the third reflective surface of the third frame member, is spaced in a parallel relation from each of the fifth and sixth edges of the third side of the block, and extends from the first corner to the second corner; and perpendicular to the fourth outside edge of the fourth frame member, which fourth outside edge is adjacent the fourth reflective surface of the fourth frame member, is spaced in a parallel relation from each of the seventh and eighth edges of the fourth side of the block, and extends from the third corner to the fourth corner;

wherein the third outside edge of the third frame member is spaced in a parallel relation from the fourth outside edge of the fourth frame member, and is perpendicular to the second outside edge of the second frame member;

wherein the first reflective surface extends continuously and uninterruptedly between the first side of the block and the first outside edge of the of the first frame member so that the first reflective surface is smooth and uninterrupted between the first side of the block and the first outside edge of the of the first frame member, the first reflective surface in its entirety lying on a first plane that extends continuously and uninterruptedly from the second edge of the block to the first outside edge of the first frame member so that the perpendicular distance between the parallel-spaced second edge of the block and the first outside edge of the first frame member is constant all along the second edge of the block in its entirety and the first reflective surface extends continuously and uninterruptedly therebetween;

wherein the second reflective surface extends continuously and uninterruptedly between the second side of the block and the second outside edge of the of the second frame member so that the second reflective surface is smooth and uninterrupted between the second side of the block and the second outside edge of the of the second frame member, the second reflective surface in its entirety lying on a second plane that extends continuously and uninterruptedly from the fourth edge of the block to the second outside edge of the second frame member so that the perpendicular distance between the parallel-spaced fourth edge of the block and the second outside edge of the second frame member is constant all along the fourth edge of the block in its entirety and the second reflective surface extends continuously and uninterruptedly therebetween;

wherein the third reflective surface extends continuously and uninterruptedly between the third side of the block and the third outside edge of the of the third frame member so that the third reflective surface is smooth and uninterrupted between the third side of the block and the third outside edge of the of the third frame member, the third reflective surface in its entirety lying on a third plane that extends continuously and uninterruptedly from the sixth edge of the block to the third outside edge of the third frame member so that the perpendicular distance between the parallel-spaced sixth edge of the block and the third outside edge of the third frame member is constant all along the sixth edge of the block in its entirety and the third reflective surface extends continuously and uninterruptedly therebetween;

wherein the fourth reflective surface extends continuously and uninterruptedly between the fourth side of the block and the fourth outside edge of the of the fourth frame member so that the fourth reflective surface is smooth and uninterrupted between the fourth side of the block and the fourth outside edge of the of the fourth frame member, the fourth reflective surface in its entirety lying on a fourth plane that extends continuously and uninterruptedly from the eighth edge of the block to the fourth outside edge of the fourth frame member so that the perpendicular distance between the parallel-spaced eighth edge of the block and the fourth outside edge of the fourth frame member is constant all along the eighth edge of the block in its entirety and the fourth reflective surface extends continuously and uninterruptedly therebetween;

wherein the front surface extends continuously and uninterruptedly between the first edge of the block and the third edge of the block, and extends continuously and uninterruptedly between the fifth edge of the block and the seventh edge of the block, so that the front surface in its entirety lies on a fifth plane that extends continuously and uninterruptedly between the first edge of the block and the third edge of the block, and that extends continuously and uninterruptedly between the fifth edge of the block and the seventh edge of the block;

wherein the first side extends continuously and uninterruptedly between the first edge of the block and the second edge of the block, so that the first side in its entirety lies on a sixth plane that extends continuously and uninterruptedly between the first edge of the block and the second edge of the block;

wherein the second side extends continuously and uninterruptedly between the third edge of the block and the fourth edge of the block, so that the second side in its entirety lies on a seventh plane that extends continuously and uninterruptedly between the third edge of the block and the fourth edge of the block;

wherein the third side extends continuously and uninterruptedly between the fifth edge of the block and the sixth edge of the block, so that the third side in its entirety lies on an eighth plane that extends continuously and uninterruptedly between the fifth edge of the block and the sixth edge of the block;

wherein the fourth side extends continuously and uninterruptedly between the seventh edge of the block and the eighth edge of the block, so that the fourth side in its entirety lies on a ninth plane that extends continuously and uninterruptedly between the seventh edge of the block and the eighth edge of the block;

wherein the sixth plane is spaced in a parallel relation to each of the first outside edge of the first frame member, the seventh plane, the third edge of the block, the fourth edge of the block, and the second outside edge of the second frame member, and is perpendicular to each of the eighth plane, the fifth edge of the block, the sixth edge of the block, the third outside edge of the third frame member, the ninth plane, the seventh edge of the block, the eighth edge of the block, and the fourth outside edge of the fourth frame member;

wherein the first and third sides of the block define a fifth corner of the block;

wherein the first reflective surface of the first frame member defines a first angularly extending edge, which extends from the fifth corner of the block to the first corner of the single, contiguous frame;

wherein the third reflective surface of the third frame member defines a second angularly extending edge, which is adjacent the first angularly extending edge of the first reflective surface of the first frame member, and which also extends from the fifth corner of the block to the first corner of the single, contiguous frame;

wherein the third and second sides of the block define a sixth corner of the block;

wherein the third reflective surface of the third frame member defines a third angularly extending edge, which extends from the sixth corner of the block to the second corner of the single, contiguous frame;

wherein the second reflective surface of the second frame member defines a fourth angularly extending edge, which is adjacent the third angularly extending edge of the third reflective surface of the third frame member, and which also extends from the sixth corner of the block to the second corner of the single, contiguous frame;

wherein the second and fourth sides of the block define a seventh corner of the block;

wherein the second reflective surface of the second frame member defines a fifth angularly extending edge, which extends from the seventh corner of the block to the third corner of the single, contiguous frame;

wherein the fourth reflective surface of the fourth frame member defines a sixth angularly extending edge, which is adjacent the fifth angularly extending edge of the second reflective surface of the second frame member, and which also extends from the seventh corner of the block to the third corner of the single, contiguous frame;

wherein the fourth and first sides of the block define an eighth corner of the block;

wherein the fourth reflective surface of the fourth frame member defines a seventh angularly extending edge, which extends from the eighth corner of the block to the fourth corner of the single, contiguous frame;

wherein the first reflective surface of the first frame member defines an eighth angularly extending edge, which is adjacent the seventh angularly extending edge of the fourth reflective surface of the fourth frame member, and which also extends from the eighth corner of the block to the fourth corner of the single, contiguous frame;

wherein the picture frame, which comprises the first, second, third, and fourth frame members, defines:

a first back edge;

a second back edge spaced from the first back edge in a parallel relation; and a third back edge extending between the first back edge and the second back edge, the third back edge being perpendicular to each of the first back edge and the second back edge;

wherein the first back edge of the picture frame is spaced in a parallel relation from each of the front surface of the block, the first side of the block, the first edge of the block, the first outside edge of the first frame member, the second side of the block, the second edge of the block, and the second outside edge of the second frame member;

wherein the first back edge of the picture frame is perpendicular to each of the third side of the block, the third edge of the block, the third outside outer-edge of the third frame member;

wherein the second back edge of the picture frame is spaced in a parallel relation from each of the front surface of the block, the first side of the block, the first edge of the block, the first outside edge of the first frame member, the second side of the block, the second edge of the block, and the second outside edge of the second frame member;

wherein the second back edge of the picture frame is perpendicular to each of the third side of the block, the third edge of the block, the third outside edge of the third frame member;

wherein the third back edge of the picture frame is spaced in a parallel relation from each of the front surface of the block, the third side of the block, the third edge of the block, the third outside edge of the third frame member;

wherein the third back edge of the picture frame is perpendicular to each of the first side of the block, the first edge of the block, the first outside edge of the first frame member, the second side of the block, the second edge of the block, and the second outside outer edge of the second frame member;

wherein the each of the first, second, and third reflective surfaces is positioned between the block and each of the first, second, and third back edges of the picture frame, respectively;

wherein the picture frame is wall mountable and thus the picture frame is configured to be mounted on a wall or another vertically-extending surface;

wherein the picture frame is configured so that, when the picture frame is mounted on the wall or another vertically-extending surface:

each of the first back edge, the second back edge, and the third back edge is in contact with, and/or proximate to, the wall or another vertically-extending surface; and each of the first back edge, the second back edge, and the third back edge is positioned between: the wall or another vertically-extending surface; and each of the first, second, and third reflective surfaces;

wherein the picture frame further comprises a support arm, wherein the support arm is configured to support the first, second, third, and fourth frame members on a table or another horizontally-extending surface;

wherein the art or decorative piece has a first configuration in which the picture frame can be mounted on the wall or another vertically-extending surface so that each of the first back edge, the second back edge, and the third back edge is in contact with, and/or proximate to, the wall or another vertically-extending surface, and so that each of the first back edge, the second back edge, and the third back edge is positioned between the wall or another vertically-extending surface, and each of the first, second, and third reflective surfaces; and wherein the art or decorative piece has a second configuration in which the support arm can support the first, second, third, and fourth frame members on the table or another horizontally-extending surface.

* * * * *